United States Patent [19]

Paal et al.

[11] Patent Number: 5,263,134
[45] Date of Patent: Nov. 16, 1993

[54] METHOD AND APPARATUS FOR CONTROLLING COMPUTER DISPLAYS BY USING A TWO DIMENSIONAL SCROLL PALETTE

[75] Inventors: Adam F. Paal, Stanford; William J. Fernandez, Fremont, both of Calif.

[73] Assignee: Apple Computer, Inc., Cupertino, Calif.

[21] Appl. No.: 922,644

[22] Filed: Jul. 30, 1992

Related U.S. Application Data

[63] Continuation of Ser. No. 426,872, Oct. 25, 1989, abandoned.

[51] Int. Cl.$^5$ ................................................ G06F 3/14
[52] U.S. Cl. ...................................... 395/158; 395/157; 395/155
[58] Field of Search ............... 395/155, 156, 157, 158, 395/706, 721, 724, 747, 750

[56] References Cited

U.S. PATENT DOCUMENTS

| | | | |
|---|---|---|---|
| 4,558,413 | 12/1985 | Schmidt et al. | 364/300 |
| 4,736,308 | 4/1988 | Heckel | 364/518 |
| 4,852,019 | 7/1989 | Vinberg et al. | 364/521 |
| 4,899,136 | 2/1990 | Beard et al. | 340/706 |
| 4,930,074 | 5/1990 | McCarthy | 364/410 |
| 4,975,690 | 12/1990 | Torres | 340/721 |

Primary Examiner—Phu K. Nguyen
Attorney, Agent, or Firm—Blakely, Sokoloff, Taylor & Zafman

[57] ABSTRACT

A computer program provides for the display of window regions on a display screen whereby the content and size of one window region is controllable in two dimensions using means provided in another window region. A cursor device and a signal generation means is used to select the two-dimensional scrolling or resizing of a window region. Controls are also provided to move and terminate window regions. Upon termination, the configuration of window regions is saved on a data storage means for use when the window regions are re-displayed. Cursor movement can be restricted to the horizontal or vertical directions only.

48 Claims, 9 Drawing Sheets

| Cursor Symbol 1 |  | cursor outside view and scrolling area |
|---|---|---|
| Cursor Symbol 2 |  | cursor inside scrolling area |
| Cursor Symbol 3 |  | cursor inside view area and near upper border |
| Cursor Symbol 4 |  | cursor inside view area and near right border |
| Cursor Symbol 5 |  | cursor inside view area and near upper and right border |
| Cursor Symbol 6 |  | cursor inside view area and near lower border |
| Cursor Symbol 7 |  | cursor inside view area and near lower and right border |
| Cursor Symbol 8 |  | cursor inside view area and near left border |
| Cursor Symbol 9 |  | cursor inside view area and near upper and left border |
| Cursor Symbol 10 |  | cursor inside view area and near lower and left border |

Figure 12

METHOD AND APPARATUS FOR CONTROLLING COMPUTER DISPLAYS BY USING A TWO DIMENSIONAL SCROLL PALETTE

This is a continuation of application Ser. No. 07/426,872, filed Oct. 25, 1989, now abandoned.

BACKGROUND OF THE INVENTION

(1) Field of the Invention

This invention relates to the two-dimensional selection of portions of a computer display area and the two-dimensional selection of the portions of information to display within the selected display area. Specifically, the field is that of interactive computer display control devices where a selected portion of the available information is viewable in a selected portion of the display area.

(2) Prior Art

Information management systems are placing increasing demands on the physical resources available for displaying information to the user. Currently, the art in computer display management provides the capability of displaying data in rectangular portions (commonly referred to as windows) of a display screen. The closest art know to the applicant is the Finder TM interface of the Apple Macintosh TM computer, manufactured by Apple Computer, Inc. of Cupertino, Calif. Controls are typically provided to resize and move windows within the confines of the physical display boundaries. Additional controls are also provided to shift the viewable portion of information within the limits of the previously defined window boundaries. This shifting of the viewable portion of the information is known as scrolling. One control means is typically provided to scroll the information horizontally; another control means is provided to scroll the data vertically. The prior art does not provide a means for scrolling the viewable portion of the information simultaneously in two dimensions without manipulating the display area directly. Current scrolling methods require the user to position the cursor inside of the window containing the information and to set the viewable region by movement of the cursor. This method may create problems if the information window is not completely viewable or the information for display is voluminous. Prior art also does not provide the capability for dynamic feedback as the viewable portion of the data is being selected. Current windowing capabilities do not provide the means for displaying, in a separate area of the display screen, a graphic two-dimensional representation of the position and size of the portion of the available information that is presently viewable. Prior art typically does not allow windows to be sized or moved beyond the physical boundaries of the display area. Windows usually need to be within view and not hidden in order to be manipulated by the devices available in the prior art. These capabilities are significant for the efficient use of a limited display area. The present invention provides these display management advances.

SUMMARY OF THE INVENTION

This invention provides a method of and a means for selecting a portion of available information for display in a selected area of a display screen. The present invention comprises an interactive computer-controlled display system including a bus for interconnecting system components, processor, a random access memory, a read only memory, a data storage means for storing data, a display device including a display screen, an alphanumeric input device, a cursor control device for interactively positioning a cursor on a display screen, and a signal generation device. This invention provides a method and means for displaying window regions on the display screen whereby the content and size of one window region ("first window region") is controlled by the two dimensional movement of the cursor and the activation of the signal generation means within another window region("second window region"). The second window region contains predetermined areas associated with different functions that operate upon the first window region. As the cursor is positioned within one of the predetermined areas, the cursor symbol changes to indicate the availability of a function for resizing or scrolling the first window region. Another implementation may indicate the availability of functions by changing the display of the predetermined area instead of the cursor symbol as the cursor moves into the predetermined area. Predetermined areas are also provided to move or terminate the second window region. Predetermined areas can also be provided to activate special functions, such as a function for zooming or expanding the first window region or the viewable area to full size, a function for causing the configuration of the palette and the first window region to revert back to the configuration prior to the last modification, a function for causing the configuration of the palette and the first window region to be configured in a default condition (e.g. located in the upper left corner), or a function to cause the configuration of the palette and the first window region to be set to a configuration set up and saved at an earlier time. As the window regions are removed from the display, the position and configuration of the window regions is saved on the data storage means in order to restore the window regions to the saved configuration when redisplayed. The shape and size of the palette and its predetermined areas can also be computed when the palette is first activated based upon the size and shape of the first window region. Controls are also provided to constrain the movement of the cursor in either the horizontal or vertical direction.

This invention provides a method and means for overcoming the failure of prior display systems of being able to manage the display area simultaneously in two dimensions.

BRIEF DESCRIPTION OF THE DRAWINGS

FIG. 12 is a chart which shows the association between the cursor symbol displayed and the position of the cursor within the palette.

DETAILED DESCRIPTION OF THE INVENTION

This invention concerns two-dimensional selection and display of a portion of information in a portion of the available display area in a computer or information management system. The following detailed description describes a two-dimensional (2 D) scroll palette as a means for managing the available display area in this manner.

Figure 11:
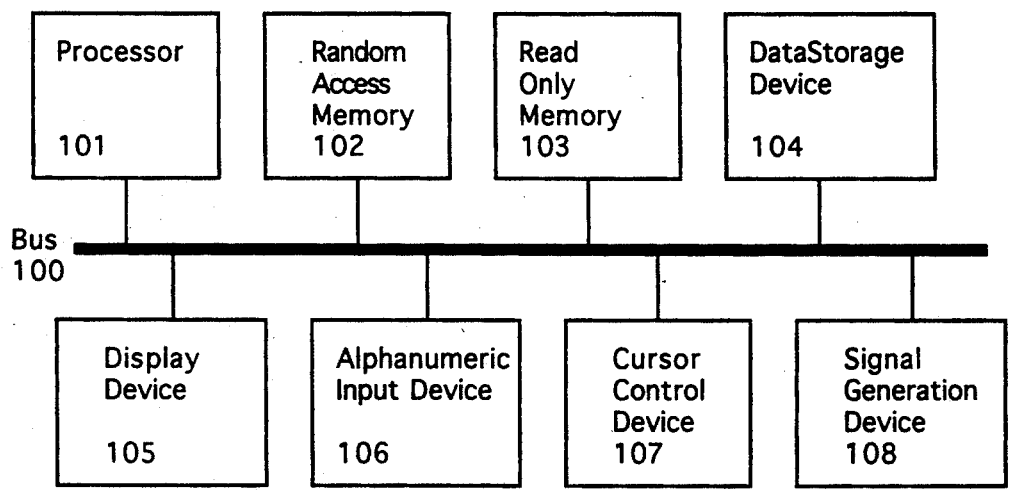
FIG. 11 is an illustration of the computer system architecture.

The preferred embodiment of the present invention is implemented on an Apple Macintosh ™ computer system. It is obvious to one of ordinary skill in the art, however, that alternative systems may be employed. In general, such systems as illustrated by FIG. 11 comprise a bus 100 for communicating information, a processor 101 coupled with said bus for processing information, a random access memory 102 coupled with said bus 100 for storing information and instructions for said processor 101, a read only memory 103 coupled with said bus 100 for storing static information and instructions for said processor 101, a data storage device 104 such as a magnetic disk and disk drive coupled with said bus 100 for storing information and instructions, a display device 105 coupled to said bus 100 for displaying information to the computer user, an alphanumeric input device 106 including alphanumeric and function keys coupled to said bus 100 for communicating information and command selections to said processor 101, a cursor control device 107 coupled to said bus for communicating information and command selections to said processor 101, a signal generation device 108 coupled to said bus 100 for communicating command selections to said processor 101.

The display device 105 may be a liquid crystal device, cathode ray tube, or other suitable display device. The cursor control device 107 allows the computer user to dynamically signal the two dimensional movement of a visible symbol on a display screen of said display device 105. Many implementations of the cursor control device are known in the art including trackball, mouse, joystick, or special keys on the alphanumeric input device 106 capable of signaling movement in a given direction.

A 2 D scroll palette provides additional controls and enhancements for these windowing and cursor systems. These features of the present invention are described below. The general operation of windows or cursors is described only where necessary to provide a thorough understanding of the present invention since these methods are known to those of ordinary skill in the art.

Operation of the Present Invention

A window region (window) usually is a rectangular portion of a computer display screen in which information is displayed to the user. Window regions may have different shapes including circular, trapezoidal, or triangular. The information may be in the form of textual, numerical, or graphical data. A window, for example, may be used to represent a single notecard within a stack of cards. The data displayed within the window represents the information written on the notecard. One well-known system for displaying such notecards is the Hypercard ™ system distributed by Apple Computer, Inc. A window management system provides controls with which the user is able to select the size and location of the window within the physical boundaries of the display. The windowing system also provides controls for scrolling or selecting the portion of data viewable within the window. In the present invention, an additional control processing means is provided to activate the 2 D scroll palette. That is, a processing means generates and displays a window region which functions as the 2 D scroll palette. Once activated, the 2 D scroll palette allows the user to manipulate the selected window and the display of information therein.

Figure 1:
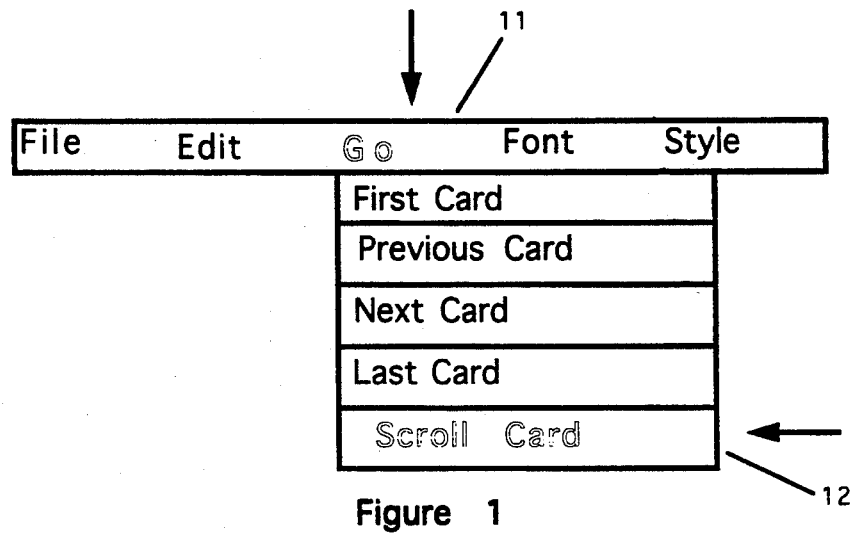
FIG. 1 is an illustration of a means for activating the two-dimensional scroll palette using a menu.

In FIG. 1, a menu for activating a process of the present invention is illustrated. Menus are windows in which the user is presented with a list of command options. The user selects an option by positioning a cursor symbol on the desired command line 12 within the desired command column 11 or within the desired command area using a mouse, joystick, or other two-dimensional cursor control device. After the cursor is positioned, the command is selected by the activation of a function key or keys associated with the cursor control device. U.S. Pat. No. 4,464,652 reissued as No. 32,632 on Mar. 29, 1988 to inventor, William Atkinson and assigned to the assignee of the present application discloses a device suitable for use as a cursor control device and means for implementing the described menu control. This method of command or function selection is used throughout the description of the present invention. Many other means of command activation may also be employed such as the entry of a special code or command sequence from the keyboard or numeric keypad or an icon selection. An icon is small graphical symbol displayed to the user and identifiable as performing some function when selected. An icon representing the 2 D scroll palette may be selected causing the present invention to be initiated. The present invention may also be activated through a software interface with the computer's operating system software or other application software. Using this method, the activation of the 2 D scroll palette can be independent of direct user action.

Figure 2:
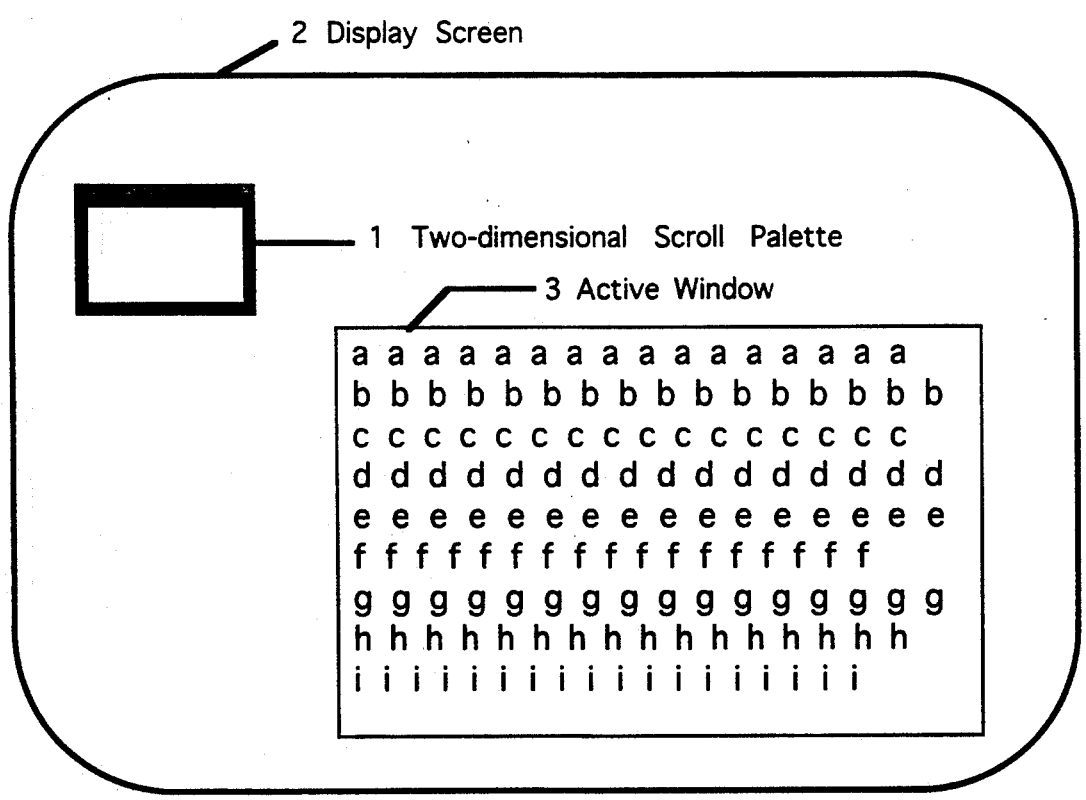
FIG. 2 is an illustration of a display screen after the scroll palette has been activated.
Figure 10:
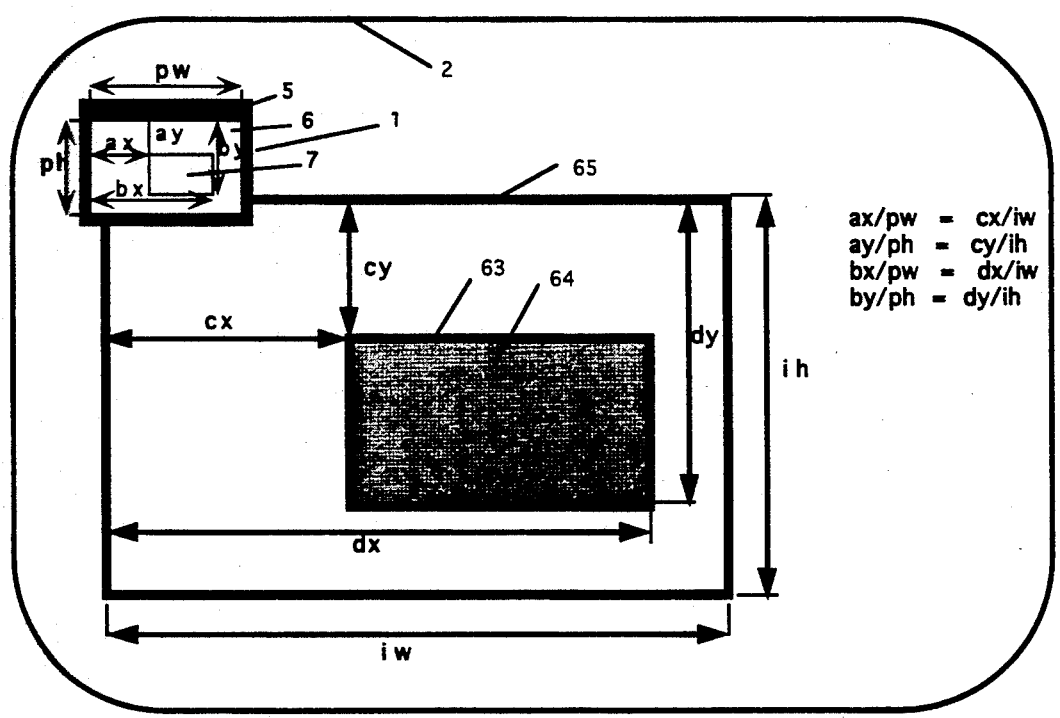
FIG. 10 is an illustration of the palette and the active window showing the computation of the size and position of the view area within the palette related to the size and position of the active window within the available data buffer.

Upon activation, the 2 D scroll palette 1 is presented to the user on the display screen 2 as shown in FIG. 2. The palette represents a scaled-down replica of the entire available data area which may or may not correspond to the actual dimensions of the viewable area. For example, the available data represented by the palette may consist of the information contained on a single notecard which is completely displayable on the display screen. The available data may also consist of a complete document or graphical artwork only a portion of which is displayable on the display screen at one time. The dimensions of the available data are known quantities based on the maximum number of characters or pixels in the horizontal and vertical directions for the displayable information. These dimensions are depicted in FIG. 10. The width of the available data is shown as iw (information width). The height of the available data is shown as ih (information height). The method for associating the 2 D scroll palette to the available information is described in the sections below.

The palette itself may be displayed as a window. It may be moved to any area of the display using controls provided by the palette itself. The palette is usually displayed at the top layer of the group of nested windows that may occupy the display screen when the palette is activated. If the palette is displayed at the top layer, it will hide whatever information is displayed at the same or lower window layers.

The 2 D scroll palette is designed to operate in conjunction with an associated active window. Although many windows or data areas may be displayed on the display screen at one time, at least one or more windows are identified as the active window(s) for the purpose of manipulation using the 2 D scroll palette. The active window is used to display to the user a portion of the data or information available for display. Since the window can be resized, a portion of the information may not fit within the border boundaries of the active window; thus, a portion of the information available for display may not always be displayed. The dimensions for the available information (iw,ih described above), may not be the same dimensions as those for the active window. However, the dimensions for the active window are also initially known values, since the active window exists prior to the initiation of the scroll palette function. Most windowing systems known in the art provide an association between the information available for display and the portion of the information currently or actively displayed in the active window. One method for associating displayable information to information currently viewable in an active window is to compute the positions of two corners of the viewable information within the available information. This association is depicted in FIG. 10. The upper left position of the viewable portion of information is defined by the offsets (cx,cy). The lower right position of the viewable portion of information is defined by the offsets (dx,dy). The size and shape of the viewable information rectangle delineated by (cx,cy) and (dx,dy) is identical to the size and shape of the active window. Since the dimensions of the available information and the dimensions of the active window are initially known values, the position of the viewable portion of information (cx,cy) and (dx,dy) is also a known value.

The active window or windows may be identified by positioning the cursor within the window and activating the cursor function key, by activating a special function key, by identifying the window using its name or number, or other means such as a signal generation means. An example of a cursor function key or signal generation means in the present embodiment is a button located on the mouse which is pressed down to set the function key active. The active window 3 is shown in FIG. 2. The active window is not required to be displayed at the top window layer in order to be manipulated by the scroll palette. The active window may be hidden, displayed off-screen, or not currently displayed, yet still be the object of action by the scroll palette. The palette may also be attached to an active window such that movement of the active window causes corresponding movement of the palette.

The initial dimensions of the 2 D scroll palette as displayed on the display screen are computed from the dimensions of the displayable information to which the scroll palette is associated. This feature allows the shape of the palette to appear similar to the dimensions of the information that the palette represents. The computation of initial palette dimension starts by testing for the larger dimension of the displayable information (iw or ih shown in FIG. 10). If the displayable information horizontal dimension (iw) is larger than the displayable information vertical dimension (ih), the 2 D scroll palette horizontal dimension (pw in FIG. 10) is set to a predetermined constant value representing the maximum size of the palette. The palette vertical dimension (ph in FIG. 10) is set to a value equivalent to the predetermined constant value multiplied by the proportion of the displayable information vertical dimension divided by the displayable information horizontal dimension. The palette initial dimension computation for a displayable information area with a larger horizontal dimension is described by the following equation:

iw = Displayable information horizontal dimension
ih = Displayable information vertical dimension
c = constant value representing maximum dimension of palette $ph = c*(ih/iw)$ where:

ph is the computed vertical dimension of palette.

If the displayable information vertical dimension (ih) is larger than the displayable information horizontal dimension (iw), the roles of the horizontal and vertical components in the above equation are reversed. Once this computation is completed, the dimensions of the palette (pw and ph) are known values retained for as long as the scroll palette is displayed.

Although the scroll palette represents the available data area, the available data is not necessarily displayed within the border of the palette. The operation of the 2 D scroll palette is not dependent upon the presence of any of the available data within the palette. This embodiment of the present invention is described as a palette not containing any of the available display data; thus, as shown in FIG. 2, the palette 1 does not contain any of the data displayed in the active window 2. Other embodiments, however are conceivable. The palette may be displayed with a reduced scale replica of the viewable data displayed within the palette. A method for generating the reduced scale data is already well known in the prior art. The Hypercard TM system distributed by Apple Computer, Inc. contains the functions capable of producing a window displaying a reduced scale replica of information displayable in full size in another window. This technology could be incorporated into the present invention without significant difficulty.

Figure 3:
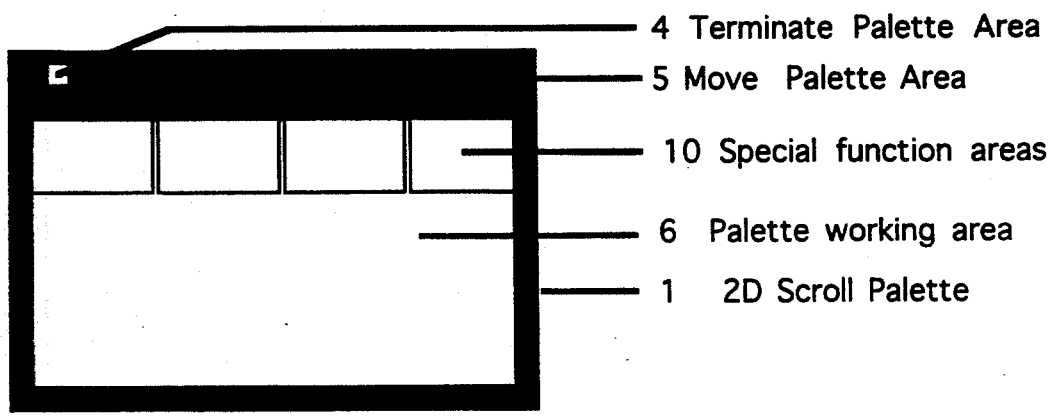
FIG. 3 is an illustration of the two-dimensional palette in its initial configuration before the view area has been resized.
Figure 4:
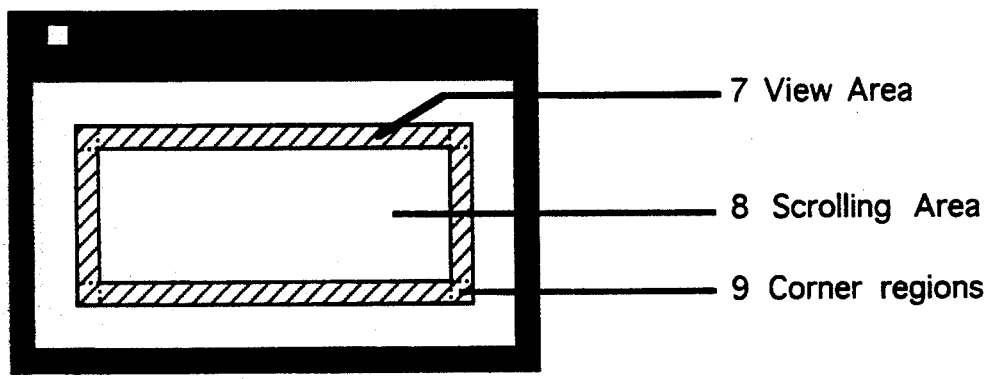
FIG. 4 is an illustration of the palette showing the view and scrolling areas and the corner regions after the view area has been resized.

The 2 D scroll palette is comprised of several different regions or predetermined areas within the palette bounds as shown in FIGS. 3 and 4. The shaded region 5 at the top of the palette is used to activate the function of moving the palette as described below. Similarly, controls are provided to terminate the 2 D scroll palette function. The palette itself provides a means for terminating the function. A small area 4 at the top left-hand side of the palette is provided for this purpose.

Predetermined areas 10 can also be provided to activate special functions, such as a function for zooming or expanding the first window region or the viewable area to full size, a function for causing the configuration of the palette and the first window region to revert back to the configuration prior to the last modification, a function for causing the configuration of the palette and the first window region to be configured in a default condition (e.g. located in the upper left corner), or a function to cause the configuration of the palette and the first window region to be set to a configuration set up and saved at an earlier time. These special predetermined areas 10 are located within the 2 D scroll palette as depicted in FIG. 3.

As shown in FIG. 4, two other regions are defined for function activation within the palette working area 6: the view area 7 used to resize the active window and the scrolling area 8 used to scroll the information viewable in the active window. Both of these regions are predetermined areas. The view area is always contained within the working area. The view area may be resized to dimensions less than or equal to the dimensions of the working area. On initial activation, the view area is sized by default to the same scaled-down dimensions as the active window as shown in FIG. 10. The dimensions of the working area (pw,ph) represent the scaled-down dimensions of the entire set of displayable information computed as shown above. The dimensions of the view area (defined by corners (ax,ay) and (bx,by)) represent the scaled-down dimensions of the active window. Thus, initially, the view area is sized to the equivalent dimensions of the full-size scaled dimensions of the active window (defined by corners (cx,cy) and (dx,dy)). As described above, the dimensions for the available information (iw,ih), the dimensions for the active window (defined by corners (cx,cy) and (dx,dy)), and the dimensions for the palette working area are known or computed values. The view area dimensions (ax,ay) and (bx,by) are computed using the equations shown below and depicted in FIG. 10:

$$ax = pw * (cx/iw)$$

$$ay = ph * (cy/ih)$$

$$bx = pw * (dx/iw)$$

$$by = ph * (dy/ih)$$

Figure 5:
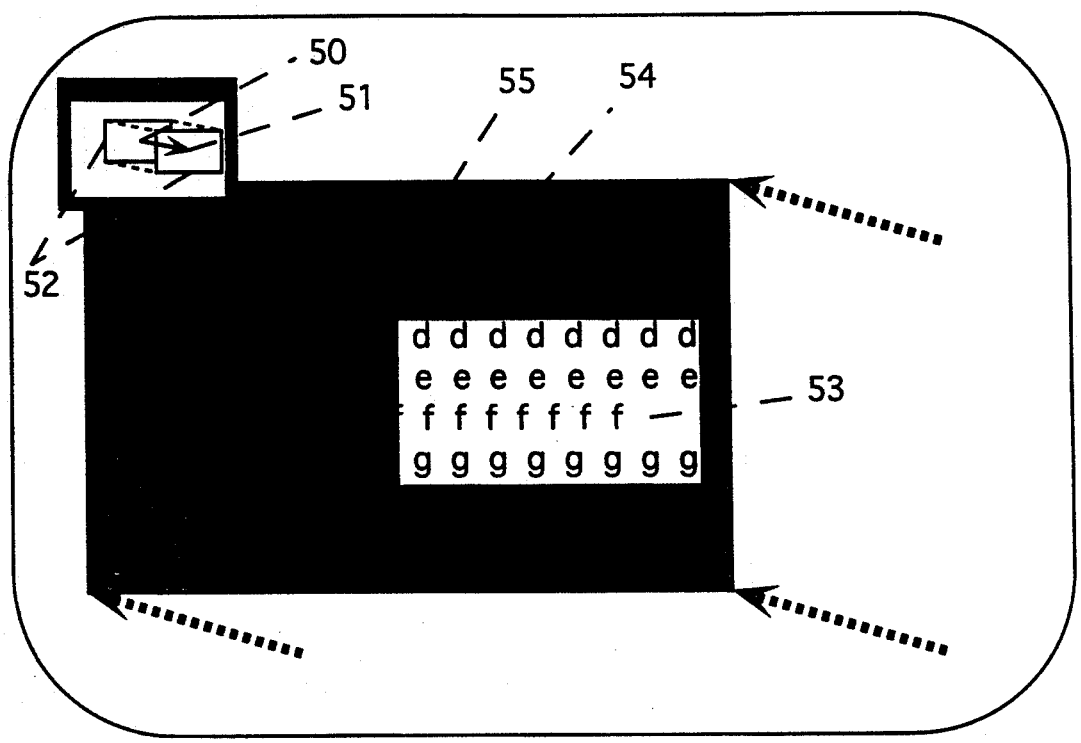
FIG. 5 is an illustration of the palette during a two dimensional scrolling operation.
Figure 6:
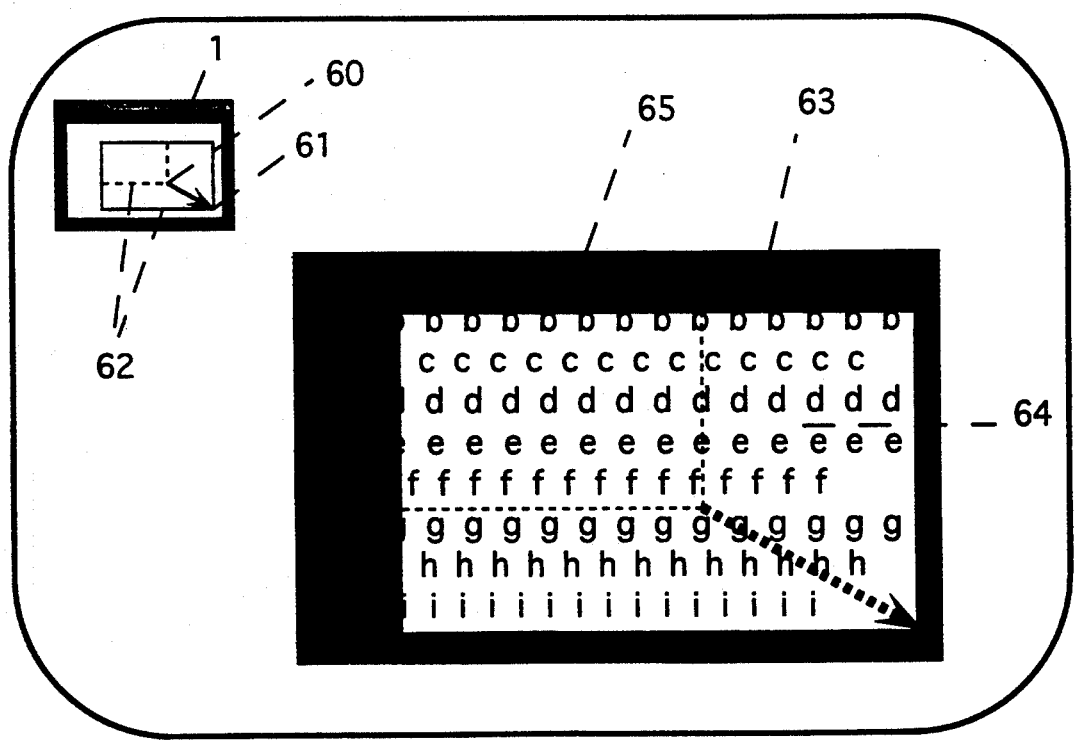
FIG. 6 is an illustration of the palette during a two dimensional resizing operation.

Once the above computation is complete, the dimensions of the view area are known; thus, the borders or outline of the view area can be displayed within the working area of the palette. On initial activation of the 2 D scroll palette, the outline of the view area may not be visible, since it may overlay the border of the working area as shown in FIG. 2. As the view area is reduced in size, the active window is reduced in an equivalent manner and the view area outline becomes visible as shown in FIGS. 5 and 6. The outline overlays the boundary of the view area. If the palette is terminated, the position and size of the view area and the position of the palette are saved in computer memory. If the position and size of the view area is changed, even while the palette is closed or hidden, the saved position and size are updated in memory such that the saved parameters always represent the actual position and size of the view area. When the palette is subsequently re-activated, the palette and the view area are displayed at the saved location and size. The size and shape of the palette can be computed on reactivation from the size and shape of the active window as described earlier.

The scrolling area 8 is always contained within the view area. The size of the scrolling area is defined by the size of the view area less a scaled length in both the horizontal and vertical dimensions. A portion of the view area is always visible around all of its four borders. As the view area is resized, the scrolling area is resized by a like amount. The view area is not allowed to be reduced to such a small dimension that the scrolling area disappears. Initially, the scrolling area is sized to the dimension of the working area less the same scaled length in both the horizontal and vertical dimensions. There is no outline displayed for the scrolling area, thus, in FIG. 4, neither the shaded area nor the border of the scrolling area is actually displayed.

Four corner regions 9, which are also predetermined areas, also exist within the view area. These regions are located within the view area, but outside of the scrolling area. Two adjacent borders of the corner regions are defined by the borders of the view area. The other two adjacent borders of the corner regions are defined by extending the scrolling area borders to meet the view area borders. The size and shape of the corner regions can also be defined as a fixed size or scaled rectangular area centered on the corner of the scrolling area. This allows the corner region to remain large enough to use even though the scrolling area is reduced to a small size. Once the 2 D scroll palette is activated, the functions that it provides become responsive to the movement of the cursor within the palette and responsive to the activation of the cursor function key or signal generation means. The function performed depends upon the position of the cursor at the time the cursor function key is activated. The function selected remains active, regardless of where the cursor is moved on the display screen, until the cursor function key is deactivated. In other embodiments, the selected function is automatically deselected if the cursor is moved outside of the palette. In this manner, the user may prevent a function from disturbing the configuration of information on the screen. This is especially useful in embodiments where the function selected is not actually performed until the cursor function key is deactivated.

Various cursor symbols are provided to identify which function is selectable. When the cursor is positioned outside of the 2 D scroll palette and the cursor function key was not activated within the palette, the cursor symbol displayed is defined by the operating system or other application software. In this situation, the control of the cursor is not under the direction of the present invention. If the cursor function key was activated within the palette, the cursor symbol displayed is determined by the function selected and controlled by the scroll palette as long as the cursor function key is active. This is true even if the cursor is positioned outside of the palette after function activation.

Within the bounds of the 2 D scroll palette, the cursor symbol displayed can be controlled by the present invention. If the cursor is positioned in terminate palette area 4 or the move palette area 5, the cursor symbol is converted to a Cursor Symbol 1 without the need for any other signals to the display system. This symbol is represented in the present invention as shown in FIG. 12. Cursor Symbol 1 is used when the cursor is located in all regions of the 2 D palette except within the palette working area 6. In some situations, Cursor Symbol 1 is also used within the working area as described below.

As the cursor is moved into the working area 6, the cursor symbol displayed depends upon whether the cursor has also crossed into the view area 7 or the scrolling area 8. If the cursor is positioned within the working area but not within either the view area or the scrolling area, the Cursor Symbol 1 is again displayed. In this case, Cursor Symbol 1 indicates that the resizing or scrolling functions are not available. These functions are described below. If the cursor is located within the view area and within the scrolling area, Cursor Symbol 2 is displayed indicating that scrolling is selectable.

If the cursor is positioned within the view area but not within the scrolling area, one of eight different cursor symbols are displayed for the resizing functions depending upon the proximity of the cursor to the borders and corners of the view area. The region of proximity is defined by the same scaled length used to define the dimensions of the scrolling area relative to the view area as shown in FIG. 4. As the cursor enters the proximity region for one or two borders, the cursor symbol displayed changes as described below. It is not possible for the cursor to simultaneously enter the proximity regions for three or all four borders.

When the cursor is positioned near the upper border of the view area but not near the left or right borders, the Cursor Symbol 3 is displayed. When the cursor is positioned near the upper border of the view area and near the left border, the cursor is located within one of the corner regions 9. In this case, the Cursor Symbol 9 is displayed. Similarly, the appropriate Cursor Symbol is displayed when the cursor is positioned in the corresponding region as shown in FIG. 12. Each of the Cursor Symbols 2-10 represent a different function that may be performed by the user when the cursor function key or keys are activated with that symbol displayed. No functions are actually performed until the user activates a function key. The cursor symbol provides the user with visual feedback as to which function is available at any given time.

In some embodiments of the present invention, the cursor symbol is not changed as the cursor is moved into different areas of the scroll palette. Other equivalent embodiments change the display of the predetermined areas into which the cursor moves instead of changing the cursor symbol. The predetermined area may be changed by backlighting the area, applying inverse video to the area, changing the color of the area, blinking, or other means to identify the area as selectable. These embodiments, however do not reduce the functionality of the palette. Regardless of the cursor symbol displayed or the means used to indicate a selectable area, the function selected will depend upon the position of the cursor at the time the signal generation means or cursor function key is activated.

Once the 2 D scroll palette is activated and the cursor is positioned for the appropriate function, one of several functions are selectable. As previously mentioned, positioning the cursor in the upper shaded region 5 of the palette allows the selection of the function that moves the palette around the display screen. The move palette function is selected by moving the cursor within the move palette area and activating the cursor function key. The palette will then follow the movement of the cursor as long as the cursor function key is activated. In this manner, the palette can be moved to any location in the display area. Again, the method of selecting functions may take many forms such as the entry of a special code or command sequence from the keyboard or numeric keypad, a menu selection, or an icon selection. Positioning the cursor over the termination area 4 in the upper-left corner allows selection of the palette termination function. If this area is selected by activating the function key while the cursor is positioned over the termination area, the palette is removed from the display and the 2 D scroll function is terminated. The active window is unaffected by the termination of the palette. If the active window was resized or scrolled using the palette, the active window remains at the selected size and scroll position even after the palette is terminated. As the palette is being terminated, several parameters related to the state of the palette are retrieved and saved in computer memory or other data storage means for later recall if the palette is re-activated. These parameters include the X-Y pixel position of the palette on the display screen, the position of the view area, the dimensions of the view area, and other configurable palette parameters. If the position and size of the view area is changed, even while the palette is closed or hidden, the saved position and size are updated in memory such that the saved parameters always represent the actual position and size of the view area. When the palette is subsequently re-activated, the saved parameters are used to generate the palette in the proper configuration. The shape and size of the palette and its predetermined areas can also be computed when the palette is first activated based upon the size and shape of the active window. This is the preferred method when one 2 D scroll palette is used to control more than one window. The saved parameters can be used in conjunction with the dimensions of the active window to compute the location, size, and shape of the 2 D scroll palette.

Similarly, positioning the cursor within the working area 6 allows the selection of functions that are used to resize the active window and functions that are used to scroll the information within the active window. If the cursor is positioned within the working area, but not within either the view area or the scrolling area and Cursor Symbol 1 is displayed, the only function available is the expand window or zoom function. This function is selected by activating a special cursor function key or by activating the cursor function key twice in rapid succession while the cursor is positioned in the working area as described earlier. The two successive activations of the cursor function key is known as double-clicking. When a double-click occurs in the working area, the active window is immediately resized or zoomed out to fill the entire display area. At the same time, the view area is expanded to fill the entire palette working area. The zoom function provides a quick way of resetting the display of the active window so that all available data capable of being displayed within the active window is displayed subject to the physical size constraints of the display screen. This is typically a full screen of data, but a smaller dimension active window may also be used.

Other special functions may be provided when the the cursor is positioned within the working area, but not within either the view area or the scrolling area and Cursor Symbol 1 is displayed. Each of these special functions have an associated predetermined area 10 provided for activating the function. These special functions include: a function for zooming or expanding the active window or the viewable area to full size, a function for causing the configuration of the palette and the active window to revert back to the configuration prior to the last modification, a function for causing the configuration of the palette and the active window to be configured in a default condition (e.g. located in the upper left corner), or a function to cause the configuration of the palette and the first window region to be set to a configuration set up and saved at an earlier time. Other functions may be provided in this area of the 2 D scroll palette.

If the cursor is positioned within the view area 7 and within the scrolling area 8, the scrolling function is selectable. This function is selected by activating the cursor function key prior to moving the cursor control device. When this occurs, the view area will follow the two-dimensional movement of the cursor within the working area as shown in FIG. 5. In FIG. 5, the cursor is positioned by the user at point 50 and the cursor function key activated. While the cursor function key is active, the cursor is moved to point 51. The outline of the view area 52 is redisplayed at the new location corresponding to the new position of the cursor. The dimensions of the view area are not changed. Simultaneously, the new portion of information displayed in the active window 53 is dynamically scrolled in two dimensions to correspond to the new position of the view area. The old position of the portion of displayed data within the set of available data 54 prior to scrolling is represented at 55. As the cursor is moved around the working area of the palette, the portion of information displayed in the active window is shifted accordingly. If an attempt is made to move the cursor beyond the edge of the working area of the palette, the cursor will be allowed to move beyond the palette border, but the borders of the view area will stop moving at the edge of the palette working area. When the cursor function key is deactivated, the view area stops following the cursor and the information displayed in the active window stops shifting. The view area remains displayed in the new position. The new portion of information remains displayed in the active window.

In equivalent embodiments of the present invention, the new portion of information selected for display in the active window may not be dynamically displayed. This is especially true of computer systems with reduced memory or processing power. In these systems, the new portion of information is typically displayed in the active window when the cursor function key is deactivated, but not updated dynamically when the cursor function key is active. In these embodiments, the scrolling of the active window may be aborted by moving the cursor outside of working area 6 before the cursor function key is deactivated. In this situation, the view area returns to the position where it was located prior to the activation of the cursor function key and the active window remains unchanged.

Some embodiments of the present invention allow the automatic termination of the 2 D scroll palette when the cursor function key is de-activated. In these embodiments, the automatic termination of the palette occurs just as if the termination area 4 had been selected explicitly by the user. The automatic termination feature saves the user an extra step by implicitly terminating the palette when the cursor function key is deactivated. Automatic termination may be enabled or disabled when the 2 D scroll palette is configured.

The constrained movement (constrain) function is also available while the cursor is positioned within the scrolling area. The constrain function allows the user to restrict the scrolling movement of the view area in either the horizontal or vertical directions. This function is selected by activating a special function key (Shift key in the present embodiment) simultaneously with the activation of the cursor function key within the scrolling area. After these key activations, the cursor is moved in the direction desired. If the initial movement of the cursor in the X direction is greater than or equal to the initial movement in the Y direction, the subsequent movement of the cursor and the view area is restricted to motion in only the horizontal direction. Similarly, if the initial movement of the cursor in the X direction is less than the initial movement in the Y direction, the subsequent movement of the cursor and the view area is restricted to motion in only the vertical direction. The restricted scrolling motion continues as long as the cursor function key is active.

The functions for resizing the active window by resizing the palette view area are accessed by positioning the cursor inside the view area and near one of the borders or near one of the corners of the view area. The proper positioning of the cursor will cause the cursor symbol to be changed as described earlier and shown in Table 1. Once the cursor has been positioned and the symbol has changed, the user may select the resize function by activating the cursor function key. The resize function is shown in FIG. 6. In FIG. 6, the cursor is positioned by the user at point 60 and the cursor function key activated. While the cursor function key is active, the cursor is moved to point 61.

As the cursor moves, an outline of the active window 63 is drawn to indicate the borders of the newly sized window. While the cursor function key is active, the view area and the outline of the active window will grow or shrink as their size follows the two-dimensional movement of the cursor in conformity with the equations in FIG. 10. If only one border of the view area was selected, then both of that border's endpoints will follow the movement of the cursor. The endpoints of the selected border will move in two-dimensions as the cursor moves. The endpoints of the other borders will be adjusted orthogonally in order to close the area. The selected border is the only one that will not change in length. If a corner of the view area is selected as shown in FIG. 6, two borders with a common endpoint will move with the cursor in two-dimensions. The three endpoints will follow the cursor. The endpoints of the unselected borders will be adjusted orthogonally to close the area. Again, only the selected borders will remain at a scaled length. If an attempt is made to move the cursor beyond the edge of the working area of the palette, the cursor will be allowed to move beyond the palette border, but the borders of the view area will stop moving at the edge of the palette working area. If the cursor moves outside of the palette while resizing of the view area is active, the opposite border or borders from the cursor position are moved in the opposite direction of the cursor until the borders of the view area reach the border of the palette working area. On the other hand, the borders of the active window outline are not constrained to the edge of the display area. In this way, the palette may represent a virtual display area greater than the actual display area.

The borders of the view area 62 and the borders of the active window outline 63 will move with the cursor as long as the cursor function key is active. When the cursor function key is deactivated, the view area and the active window outline will be fixed at the new cursor position. At that time, the active window itself will be resized to the dimensions of the active window outline, a new portion of information 64 will be displayed in the resized active window, and the outline will be removed from the display. This process is similar when any of the four borders or four corners of the view area are selected.

In some embodiments of the present invention, the active window is resized dynamically as the cursor is moved with the cursor function key active. In these embodiments, the new portion of information 64 is also usually dynamically updated. While this embodiment requires a more powerful processor or larger memory, the operation of the palette is equivalent.

Processing Logic for the Present Invention

The present invention includes computer program logic for the operation of the 2 D Scroll Palette. This logic is described in the following section and in FIGS. 7-9. In addition to the computer resources described earlier, the present invention relies upon the availability of an operating system and system functions capable of displaying windows, information within windows, characters, and cursor symbols on the display device. System functions for interfacing with the cursor control device and cursor function keys are also required. These resources are standard processing components known in the computer art.

When the processing device of the present invention is first powered up, the operating system logic takes control and initializes the system components such as read/write memory, the display device, the cursor control device, the cursor function keys, and keyboard. The computer memory area for saving the scroll palette parameters described earlier is also initialized to default parameter values. At the end of its initialization cycle or in response to a user command, the operating system displays a menu similar to the menu in FIG. 1. The 2 D Scroll Palette program logic gets control when the appropriate menu selection is made from the menu as shown in FIG. 1. As described earlier, other means for activating the 2 D scroll palette are available.

Figure 7:
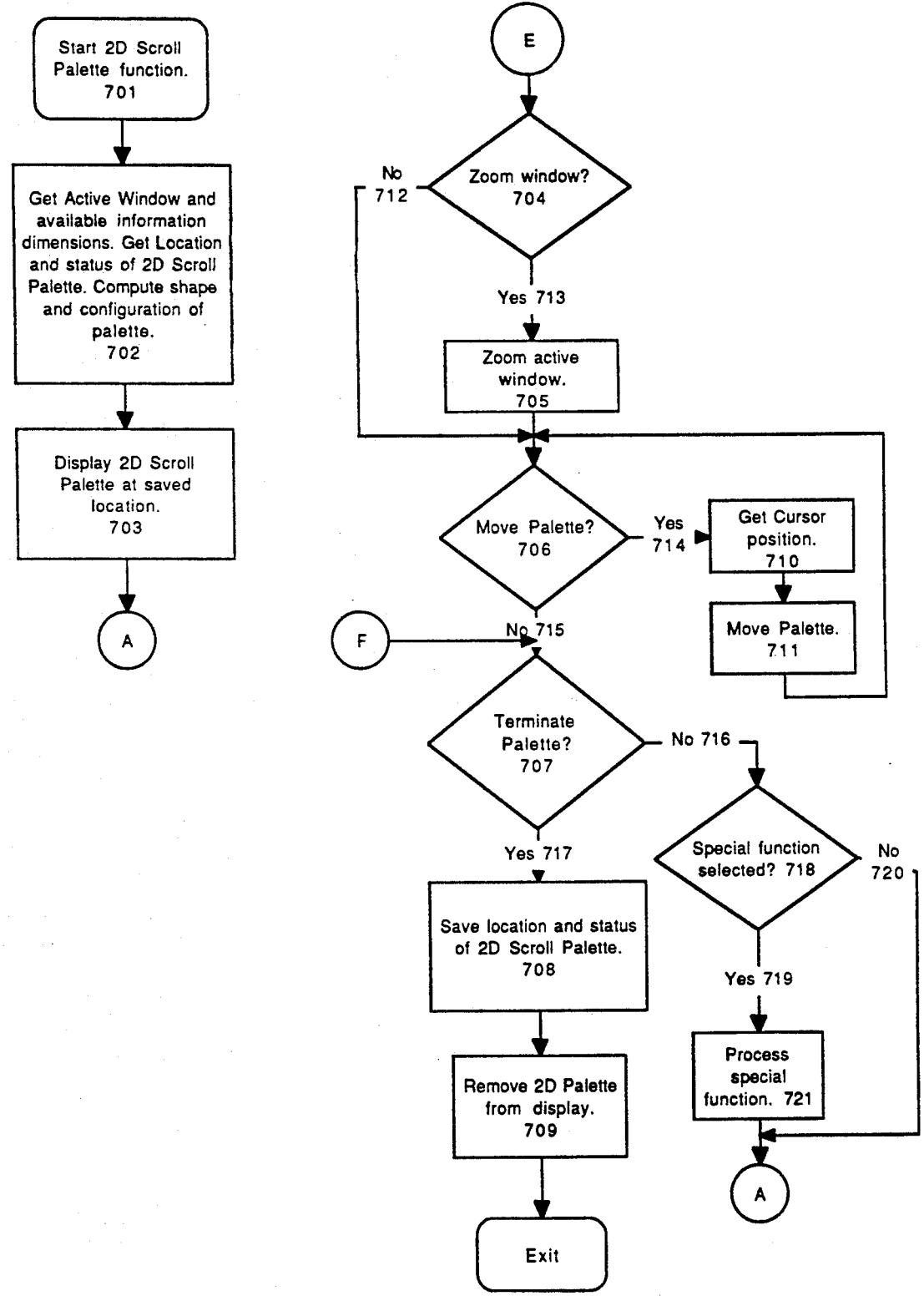
FIGS. 7, 8 and 9 are flowcharts of the representative computer program that implements this scheme.

Once the 2 D Scroll Palette program logic is activated, the processing flow begins as shown in FIG. 7 at the box labeled "Start 2 D Scroll Palette function" 701. First, the scroll palette is displayed on the display device 703 in the location and form computed from the dimensions of the active window, the dimensions of the available information, and defined by the palette parameters as previously saved or initialized in memory 702. This computation was described earlier and is depicted in FIG. 10. Next, the palette program enters a loop starting at A in FIG. 8 which begins the process of looking for the movement of the cursor control device. The position of the cursor may be obtained through a call to a system function 801. The palette program may also be notified by the operating system of cursor movement within the palette via a message sent to the palette program. If the cursor is positioned outside of the 2 D scroll palette 802, control passes to the logic beginning at F in FIG. 7. The logic at F looks for a function key or menu selection requesting the termination of the 2 D scroll palette 707. If palette termination is not requested 716, the selection of a special function is checked 718. A special function is selected by positioning the cursor inside of one of the special predetermined areas and activating the cursor function key as described earlier. If a special function is selected 719, the function is processed 721 and control returns to A. If a special function is not selected 720, control is transferred to A directly. The processing loop is complete for an unterminated palette. If palette termination is requested 717, the palette parameters will be saved in a memory storage area as described earlier 708. Control will then return to the operating system after the palette is removed from the display 709.

Figure 8:
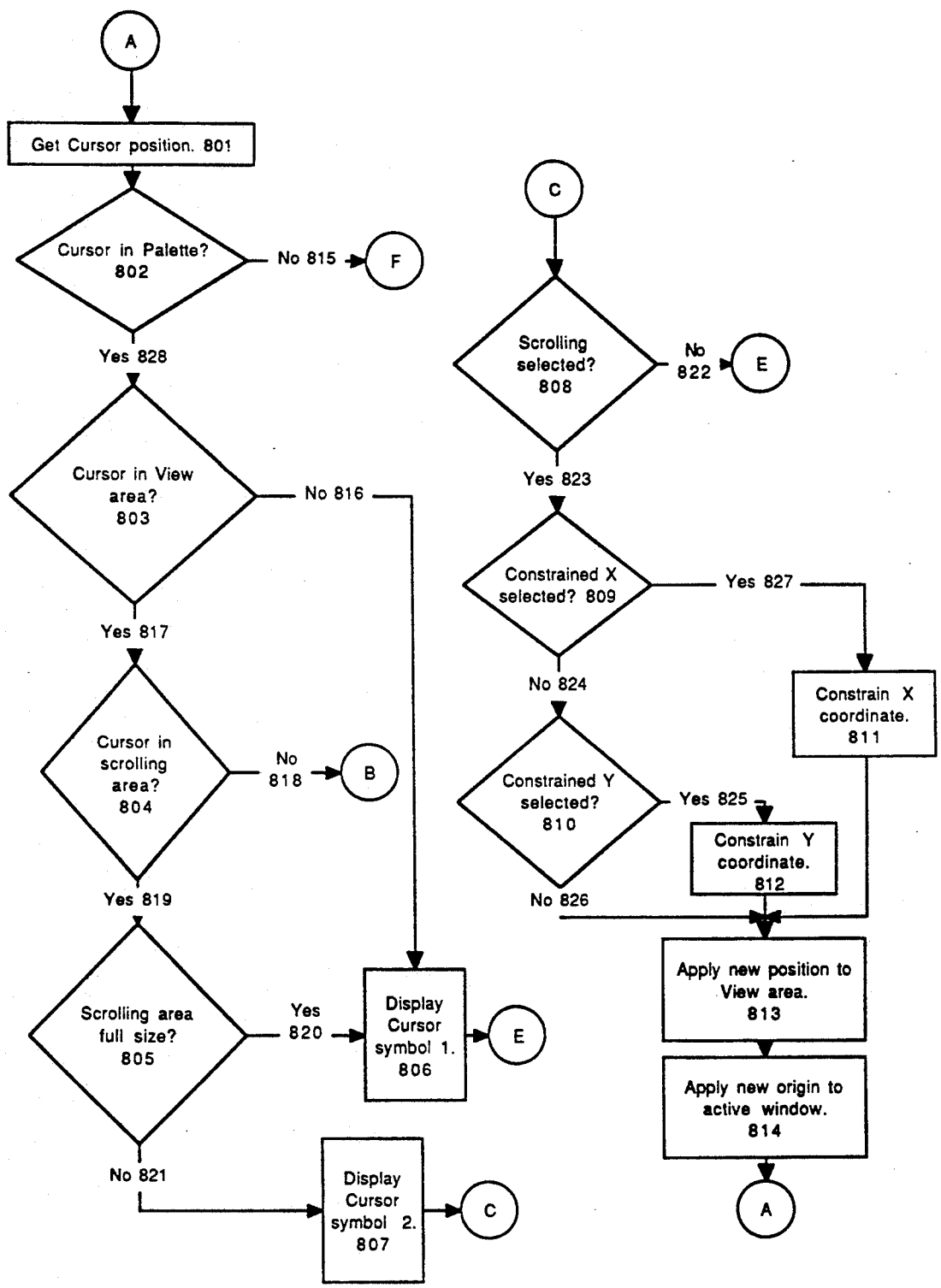

Returning to the program logic beneath A in FIG. 8, if the cursor is positioned within the boundaries of the 2 D scroll palette 802, two more tests are required to determine if the cursor is within the view area or the scrolling area. If not within the view area 803, Cursor Symbol 1 is displayed 806 and control returns to E, since the resizing and scrolling functions are not available in this case. If the cursor is within the view area but not within the scrolling area 804, control passes to the window resizing logic starting at B in FIG. 9. The logic flow starting at B is described below. If the cursor is positioned within the scrolling area and the scrolling area is less than full size 805, the window scrolling logic at C in FIG. 8 is executed after Cursor Symbol 2 is displayed 807. If the scrolling area is full size 805, scrolling is not necessary since all available data is already displayed. In this case, Cursor Symbol 1 is displayed 806 and control returns to E. If the dimensions of the available data is greater than the active window, scrolling will always be available.

The window scrolling logic at C in FIG. 8 begins a loop that continues as long as the cursor function key is active. First, the cursor function key is checked. If this key is not active, scrolling is not selected 808; thus, control returns to E in FIG. 7. If the cursor function key is active, the status of the constrain function is checked 809. If scrolling had previously been constrained in either the horizontal or vertical directions by the activation of a special function key described earlier, the scrolling area 8 position is adjusted by replacing the constrained horizontal 811 or vertical 812 component of the new position with the old scrolling area position component. In this way, the scrolling of the active window 3 is restricted to horizontal or vertical movement. The outline of the view area 7 is moved to the new cursor position 813, which determines the new position of the scrolling area 8. The new position of the view area 7 defines new values for the corners of the view area (ax,ay) and (bx,by) as shown in FIG. 10.

After the new position of the view area 7 is determined, the view area 7 position relative to the whole working area of the palette is known in both the horizontal and vertical directions. This view area 7 position is defined by the corners (ax,ay) and (bx,by). These corner positions and the known dimensions of the palette working area 6 (pw,ph) are used to recompute the portion of information displayed in the active window. This computation is the reverse of the computation described earlier for the initial display of the palette. The values sought, in this instance, are the position of the corners of the viewable information ((cx,cy),(dx,dy)) within the available data (iw,ih) as shown in FIG. 10. The equations describing this computation are defined as follows:

$$cx = iw*(ax/pw)$$

$$cy = ih*(ay/ph)$$

$$dx = iw*(bx/pw)$$

$$dy = ih*(by/ph)$$

In the first equation, the view area 7 upper-left corner horizontal position (ax) is divided by the horizontal dimension of the working area 6 of the palette. This value represents a scale factor which is multiplied by the horizontal dimension of the available information (iw). The result is cx which is the upper-left corner horizontal position of the viewable portion of the available information. The next three equations perform similar computations for generating the position of viewable portion of the available information. The upper-left corner vertical position (cy), lower-right corner horizontal position (dx), and the lower-right corner vertical position (dy) are each computed as described above for cx. In this way, the position of the viewable portion of information (defined by corners (cx,cy) and (dx,dy)) within the information buffer (iw,ih) can be computed corresponding to the position of the view area 7 (defined by (ax,ay) and (bx,by)) within the palette working area 6 (pw,ph). This position within the information buffer becomes the new origin of the information displayed in the active window. Using well-known techniques (e.g. system calls provided by an operating system window manager), the active window is recentered to the new data origin 814. This recentering causes a new portion of information to be displayed in the active window. Control passes to A where the loop iterates with a new cursor position.

Figure 9:
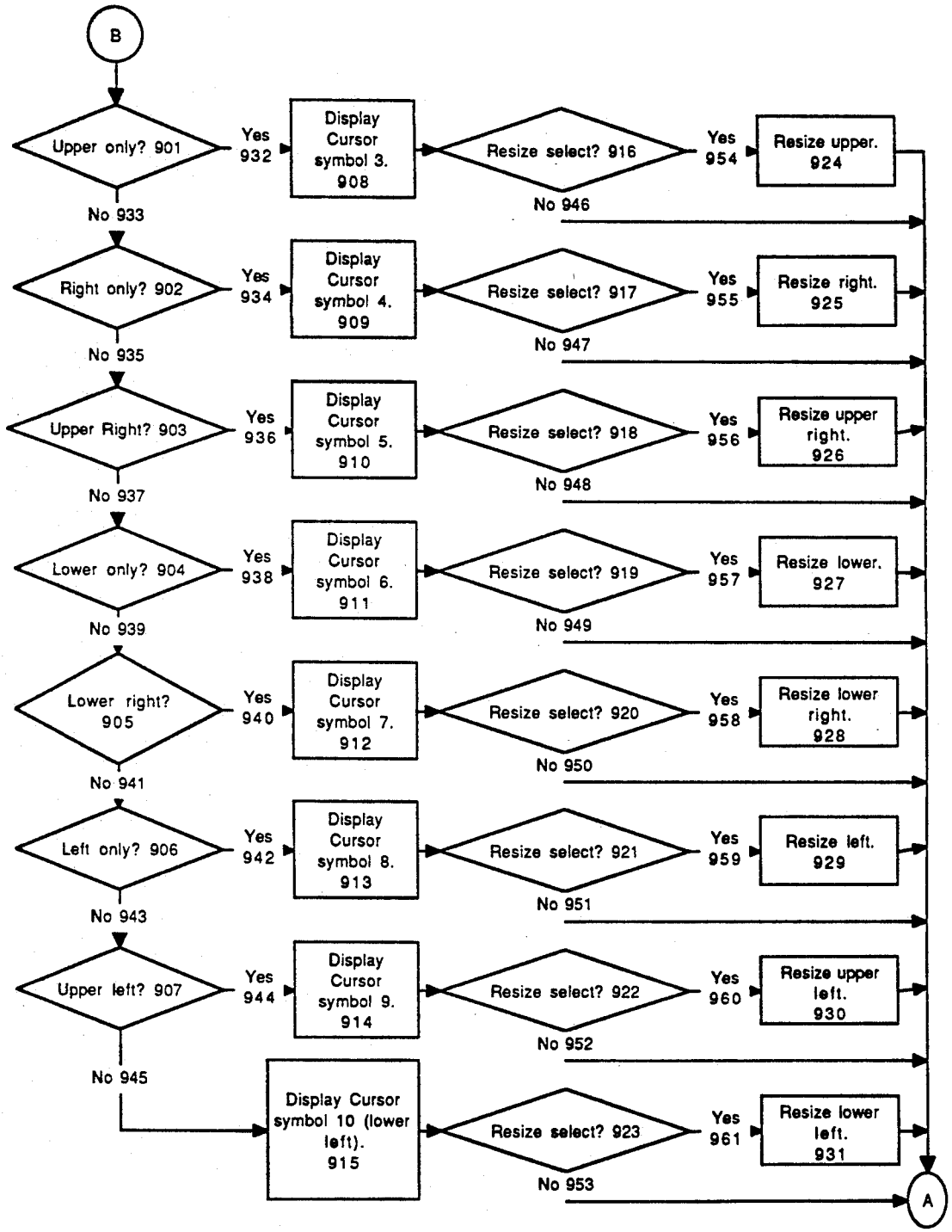

The window resizing logic starting at B in FIG. 9 is executed when the cursor is positioned near a view area border or corner. The cursor is near a border or corner when it is within the proximity region described earlier. The logic at B tests the cursor position against the proximity region for each view area border or corner 901-907 in order to determine which Cursor Symbol is appropriate for display 908-915. If the resize operation is selected through the activation of the cursor function key 916-923, the view area and the active window are resized as follows 924-931: first, an outline is displayed around the active window. Next, the movement of the cursor is applied to the endpoints of the selected border or borders of the view area and the borders of the active window outline as shown in FIG. 6. The unselected border endpoints are adjusted orthogonally to close the area for both the view area and the active window outline. The borders for both the view area and the active window are adjusted so the equations shown in FIG. 10 are always true.

After the new size of the view area 7 is determined, the view area 7 dimensions relative to the whole working area of the palette are known in both the horizontal and vertical directions. These new view area 7 dimensions are defined by the corners (ax,ay) and (bx,by). These corner positions and the known dimensions of the palette working area 6 (pw,ph) are used to recompute the portion of information displayed in the active window. This computation is similar to the one described above for the movement of the view area. The values sought for resizing the view area 7 are the same values generated for the movement of the view area 7. These values represent the position of the corners of the viewable information ((cx,cy),(dx,dy)) within the available data (iw,ih) as shown in FIG. 10. The equations describing this computation are defined as follows:

$cx = iw*(ax/pw)$ $cy = ih*(ay/ph)$ $dx = iw*(bx/pw)$ $dy = ih*(by/ph)$

These equations perform similar computations for generating the position of the viewable portion of the available information just as described above. The upper-left corner horizontal position (cx), upper-left corner vertical position (cy), lower-right corner horizontal position (dx), and the lower-right corner vertical position (dy) are each computed as needed and as described above. In this way, the position of the viewable portion of information (defined by corners (cx,cy) and (dx,dy)) within the information buffer (iw,ih) can be computed corresponding to the dimensions of the view area 7 (defined by (ax,ay) and (bx,by)) within the palette working area 6 (pw,ph). This viewable area within the information buffer becomes the new origin of the information displayed in the active window. Using well-known techniques (e.g. system calls provided by an operating system window manager), the active window is resized to the new dimensions computed above. This resizing causes a new portion of information to be displayed in the active window. Control passes to A where the loop iterates with a new cursor position.

This resizing process will continue as long as the cursor function key is selected. If the resizing operation is de-selected via releasing the cursor function key or preemption by another function, the active window itself is resized to the dimensions of the active window outline and the active window outline is removed from the display. Control returns to A where processing begins again with a new cursor position. In embodiments where the active window is dynamically resized, the active window itself is resized as the cursor is moved while the cursor function key is selected. In this case, there is no need for an active window outline.

Although this invention has been shown in relation to a particular embodiment, it should not be considered so limited. Rather, it is limited only by the appended claims.

What is claimed is:

1. In an interactive computer-controlled display system having a processor, means for accessing displayable information having predetermined dimensions, a data display screen coupled to said processor for displaying said displayable information, and a cursor control device coupled to said processor for interactively positioning a cursor on said lay screen, a computer implemented process for interactively selecting a portion of said displayable information which is displayed within a region of said display screen, said process comprising the steps of:

generating and displaying first window region on said data display screen, said first window region having a border, a first displayed portion of said displayable information being displayed within said border of said first window region such that an undisplayed portion of said displayable information is not displayed on said data display screen;

generating and displaying a second window region being associated with said first window region, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region; and moving said third window region in two dimensions within said second window region to selectively display a second displayed portion of said displayable information within said border of said first window region, said second displayed portion being different from said first displayed portion.

2. The process as in claim 1 wherein said computer-controlled display system further includes a signal generation means coupled to said processor, said third window region includes a first predetermined area associated with said third window region, said step of moving said third window region comprising:
positioning said cursor over said first predetermined area;
operating said signal generation means to signal the selection of said third window region for movement while said cursor is positioned over said first predetermined area; and
moving said third window region by operating said cursor control device to move said cursor.

3. The process as in claim 2 wherein said process further including the step of resizing said third window region in two dimensions within said second window region to selectively display said second displayed portion of said displayable information within said border of said first window region, wherein said third window region includes a second predetermined area associated with said third window region, said step of resizing comprising:
positioning said cursor over said second predetermined area;
operating said signal generation means to signal the selection of said third window region for resizing while said cursor is positioned over said second predetermined area; and
resizing said third window region by operating said cursor device to move said cursor.

4. The process as in claim 2 including the step of dynamically changing the displayed cursor symbol, said step comprising:
dynamically changing the displayed cursor symbol to one of a plurality of cursor symbols associated with said first predetermined area as said cursor is positioned within said first predetermined area.

5. The process as in claim 1 wherein said computer-controlled display system further includes a data storage means coupled to said processor, said process including the step of saving parameters in said data storage means, said step comprising:
retrieving and storing parameters associated with said second window region and said third window region in said data storage device such that said parameters can be recovered from said data storage device when said second window region is selected for display and said second and third window regions can be restored to the saved configuration.

6. The process as in claim 1 wherein said first window region is not visible on said display screen.

7. The process as in claim 1 wherein said second window region is displayed on said data display screen without any of said displayable information being displayed within said border of said second window region.

8. The process as in claim 1 wherein said second window region is displayed on said data display screen with a reduced scale replica of a portion of said displayable information being displayed within said border of said second window region.

9. The process as in claim 1 wherein said computer-controlled display system further includes a signal generation means coupled to said processor, said third window region includes a first predetermined area associated with said third window region, said step of moving said third window region comprising:
positioning said cursor over said first predetermined area;
operating said signal generation means to signal the selection of said third window region for movement in the horizontal direction only while said cursor is positioned over said first predetermined area;
moving said third window region in the horizontal direction only by operating said cursor control device to move said cursor.

10. The process as in claim 1 wherein said computer-controlled display system further includes a signal generation means coupled to said processor, said third window region includes a first predetermined area associated with said third window region, said step of moving said third window region comprising:
positioning said cursor over said first predetermined area;
operating said signal generation means to signal the selection of said third window region for movement in the vertical direction only while said cursor is positioned over said first predetermined area;
moving said third window region in the vertical direction only by operating said cursor control device to move said cursor.

11. The process as in claim 1 wherein the location of said second window region on said data display screen changes in corresponding fashion when said first window region is moved.

12. The process as in claim 1 wherein said second window region and said third window region are automatically terminated from said data display screen when said step of moving said third window region is completed.

13. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a computer implemented process for interactively selecting a portion of said displayable information which is displayed within a region of said display screen, said process comprising the steps of:
generating and displaying a first displayed portion of said displayable information being displayed within said border of said first window region such that an undisplayed portion of said displayable information is not displayed on said data display screen;
generating and displaying a second window region being associated with said first window region, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region; and resizing said third window region in two dimensions within said second window region to selectively display a second displayed portion of said displayable information within said border of said first window region, said second displayed portion being different from said first displayed portion.

14. The process as in claim 13 wherein said computer-controlled display system further includes a signal generation means coupled to said processor, said third window region includes a first predetermined area associated with said third window region, said step of moving said third window region comprising:
positioning said cursor over said first predetermined area;
operating said signal generation means to signal the selection of said third window region for resizing while said cursor is positioned over said first predetermined area; and
resizing said third window region by operating said cursor control device to move said cursor.

15. The process as in claim 14 including the step of dynamically changing the displayed cursor symbol, said step comprising:
dynamically changing the displayed cursor symbol to one of a plurality of cursor symbols associated with said first predetermined area as said cursor is positioned within said first predetermined area.

16. The process as in claim 13 wherein said computer-controlled display system further includes a data storage means coupled to said processor, said process including the step of saving parameters in said data storage means, said step comprising:
retrieving and storing parameters associated with said second window region and said third window region in said data storage device such that said parameters can be recovered from said data storage device when said second window region is selected for display and said second and third window regions can be restored to the saved configuration.

17. The process as in claim 13 wherein said first window region is not visible on said display screen.

18. The process as in claim 13 wherein said second window region is displayed on said data display screen without any of said displayable information being displayed within said border of said second window region.

19. The process as in claim 13 wherein said second window region is displayed on said data display screen with a reduced scale replica of a portion of said displayable information being displayed within said border of said second window region.

20. The process as in claim 13 wherein the location of said second window region on said data display screen changes in corresponding fashion when said first window region is moved.

21. The process as in claim 13 wherein said second window region and said third window region are automatically terminated from said data display screen when said step of resizing said third window region is completed.

22. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a computer implemented process for interactively selecting a portion of said displayable information which is displayed within a region of said display screen and interactively controlling a window region which is displayed within said display screen, said process comprising the steps of:
generating and displaying a first window region on said data display screen, said first window region having a border, a first displayed portion of said displayable information being displayed within said border of said first window region such that an undisplayed portion of said displayable information is not displayed on said data display screen;
generating and displaying a second window region being associated with said first window region, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region;
moving said third window region in two dimensions within said second window region to selectively display a second displayed portion of said displayable information within said border of said first window region, said second displayed portion being different from said first displayed portion;
resizing said third window region in two dimensions within said second window region to selectively display said second displayed portion of said displayable information within said border of said first window region;
moving said second window region in two dimensions within said display screen simultaneously with the corresponding movement of said third window region; and
terminating and removing said second window region from said display screen simultaneously with the corresponding termination and removal of said third window region.

23. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a computer implemented process for interactively selecting a portion of said displayable information within a region of said display screen, said process comprising the steps of:
generating and displaying a first window region on said data display screen, said first window region having a border, a first displayed portion of said displayable information being displayed within said border of said first window region such that an undisplayed portion of said displayable information is not displayed on said data display screen;
generating and displaying a second window region being associated with said first window region, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region; and moving said third window region in two dimensions within said second window region to selectively display a second displayed portion of said displayable information within said border of said first window region, said second displayed portion being different from said first displayed portion;

expanding said third window region in two dimensions within said second window region to selectively display all of said displayable information within said border of said first window region.

24. The process as in claim 23 wherein said computer-controlled display system further includes a signal generation means coupled to said processor, said second window region includes a first predetermined area associated with said third window region, said step of expanding said third window region comprising:

positioning said cursor over said first predetermined area;

operating said signal generation means to signal the selection of said third window region for expansion while said cursor is positioned over said first predetermined area.

25. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a device for interactively selecting a portion of said displayable information which is displayed within a region of said display screen, said device comprising:

a means for generating and displaying a first window region on said data display screen, said first window region having a border, a first displayed portion of said displayable information being displayed within said border of said first window region such that an undisplayed portion of said displayable information is not displayed on said data display screen, said means for generating and displaying said first window region being coupled to said processor;

a means for generating and displaying a second window region being associated with said first window region on said display screen, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region, said means for generating and displaying said second window region being coupled to said processor; and means for moving said third window region in two dimensions within said second window region to selectively display a second displayed portion of said displayable information within said border of said first window region, said second displayed portion being different from said first displayed portion, said means for moving said third window region being coupled to said processor.

26. The device in claim 25 wherein said computer-controlled display system further includes a signal generation means coupled to said processor, said third window region includes a first predetermined area associated with said third window region, said means for moving said third window region comprising:

means for positioning said cursor over said first predetermined area;

means for operating said signal generation means to signal the selection of said third window region for movement while said cursor is positioned over said first predetermined area; and means for moving said third window region by operating said cursor control device to move said cursor.

27. The device as in claim 26 wherein said device further including the means for resizing said third window region in two dimensions within said second window region to selectively display said second displayed portion of said displayable information within said border of said first window region, wherein said third window region includes a second predetermined area associated with said third window region, said means for resizing comprising:

means for positioning said cursor over said second predetermined area;

means for operating said signal generation means to signal the selection of said third window region for resizing while said cursor is positioned over said second predetermined area; and means for resizing said third window region by operating said cursor control device to move said cursor.

28. The device as in claim 26 including the means for dynamically changing the displayed cursor symbol comprising:

means for dynamically changing the displayed cursor symbol to one of a plurality of cursor symbols associated with said first predetermined area as said cursor is positioned within said first predetermined area, said means for dynamically changing the displayed cursor symbol being coupled to said processor.

29. The device as in claim 25 wherein said computer-controlled display system includes a data storage means coupled to said processor, said device further including means for saving parameters in said data storage means, said means for saving parameters coupled to said processor, said means for saving parameters comprising:

means for retrieving and storing parameters associated with said second window region and said third window region in said data storage device such that said parameters can be recovered from said data storage device when said second window region is selected for display and said second and third window regions can be restored to the saved configuration.

30. The device as in claim 25 wherein said first window region is not visible on said display screen.

31. The device as in claim 25 wherein said second window region is displayed on said data display screen without any of said displayable information being displayed within said border of said second window region.

32. The device as in claim 25 wherein said second window region is displayed on said data display screen with a reduced scale replica of a portion of said displayable information being displayed within said border of said second window region.

33. The device in claim 25 wherein said computer-controlled display system further includes a signal generation means coupled to said processor, said third window region includes a first predetermined area associated with said third window region, said means for moving said third window region comprising:
  means for positioning said cursor over said first predetermined area;
  means for operating said signal generation means to signal the selection of said third window region for movement in the horizontal direction only while said cursor is positioned over said first predetermined area;
  means for moving said third window region in the horizontal direction only by operating said cursor control device to move said cursor.

34. The device in claim 25 wherein said computer-controlled display system further includes a signal generation means coupled to said processor, said third window region includes a first predetermined area associated with said third window region, said means for moving said third window region comprising:
  means for positioning said cursor over said first predetermined area;
  means for operating said signal generation means to signal the selection of said third window region for movement in the vertical direction only while said cursor is positioned over said first predetermined area;
  means for moving said third window region in the vertical direction only by operating said cursor control device to move said cursor.

35. The device as in claim 25 wherein the location of said second window region on said data display screen changes in corresponding fashion when said first window region is moved.

36. The device as in claim 25 wherein said second window region and said third window region are automatically terminated from said data display screen when said step of moving said third window region is completed.

37. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a device for interactively selecting a portion of said displayable information which is displayed within a region of said display screen, said device comprising:
  a means for generating and displaying a first window region on said data display screen, said first window region having a border, a first displayed portion of said displayable information being displayed within said border of said first window region such that an undisplayed portion of said displayable information is not displayed on said data display screen, said means for generating and displaying said first window region being coupled to said processor;
  a means for generating and displaying a second window region being associated with said first window region on said display screen, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region, said means for generating and displaying said second window region being coupled to said processor; and
  means for resizing said third window region in two dimensions within said second window region to selectively display a second displayed portion of said displayable information within said border of said first window region, said second displayed portion being different from said first displayed portion, said means for resizing said third window region being coupled to said processor.

38. The device in claim 37 wherein said computer-controlled display system further includes a signal generation means coupled to said processor, said third window region includes a first predetermined area associated with said third window region, said means for resizing said third window region comprising:
  means for positioning said cursor over said first predetermined area;
  means for operating said signal generation means to signal the selection of said third window region for resizing while said cursor is positioned over said first predetermined area; and
  means for resizing said third window region by operating said cursor control device to move said cursor.

39. The device as in claim 38 including the means for dynamically changing the displayed cursor symbol comprising:
  means for dynamically changing the displayed cursor symbol to one of a plurality of cursor symbols associated with said first predetermined area as said cursor is positioned within said first predetermined area, said means for dynamically changing the displayed cursor symbol being coupled to said processor.

40. The device as in claim 37 wherein said computer-controlled display system includes a data storage means coupled to said processor, said device further including means for saving parameters in said data storage means, said means for saving parameters coupled to said processor, said means for saving parameters comprising:
  means for retrieving and storing parameters associated with said second window region and said third window region in said data storage device such that said parameters can be recovered from said data storage device when said second window region is selected for display and said second and third window regions can be restored to the saved configuration.

41. The device as in claim 37 wherein said first window region is not visible on said display screen.

42. The device as in claim 37 wherein said second window region is displayed on said data display screen without any of said displayable information being displayed within said border of said second window region.

43. The device as in claim 37 wherein said second window region is displayed on said data display screen with a reduced scale replica of a portion of said displayable information being displayed within said border of said second window region.

44. The device as in claim 37 wherein the location of said second window region on said data display screen changes in corresponding fashion when said first window region is moved.

45. The device as in claim 37 wherein said second window region and said third window region are automatically terminated from said data display screen when said step of moving said third window region is completed.

46. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a device for interactively selecting a portion of said displayable information which is displayed within a region of said display screen, said device comprising:

a means for generating and displaying a first window region on said data display screen, said first window region having a border, a first displayed portion of said displayable information being displayed within said border of said first window region such that an undisplayed portion of said displayable information is not displayed on said data display screen, said means for generating and displaying said first window region being coupled to said processor;

a means for generating and displaying a second window region being associated with said first window region on said data display screen, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region, said means for generating and displaying said second window region being coupled to said processor, means for moving said third window region in two dimensions within said second window region to selectively display a second displayed portion of said displayable information within said border of said first window region, said second displayed portion being different from said first displayed portion, said means for moving said third window region being coupled to said processor;

means for resizing said third window region in two dimensions within said second window region to selectively display a second displayed portion of said displayable information within said border of said first window region, said means for resizing said third window region being coupled to said processor;

means for moving said second window region in two dimensions within said display screen simultaneously with the corresponding movement of said third window region, said means for moving said second window region being coupled to said processor;

means for terminating and removing said second window region from said data display screen simultaneously with the corresponding termination and removal of said third window region, said means for terminating and removing said second window region and said third window region being coupled to said processor.

47. In an interactive computer-controlled display system having a processor, means for accessing displayable information having predetermined dimensions, a data display screen coupled to said processor for displaying said displayable information, and a cursor control device coupled to said processor for interactively positioning a cursor on said display screen, a device for interactively selecting a portion of said displayable information which is displayed within a region of said display screen, said device comprising:

means for generating and displaying a first window region on said data display screen, said first window region having a border, a first displayed portion of said displayable information being displayed within said border of said first window region such that an undisplayed portion of said displayable information is not displayed on said data display screen, said means for generating and displaying said first window region being coupled to said processor;

means for generating and displaying a second window region being associated with said first window region on said data display screen, said second window region having a border, said second window region being displayed concurrently on said data display screen with said first window region, said border of said second window region corresponding to said predetermined dimensions of said displayable information, said second window region having a third window region within said second window region, said third window region having a border corresponding to said first displayed portion of said displayable information, said third window region being located in a different position on said data display screen than a position of said first window region, said means for generating and displaying said second window region being coupled to said processor; and means for expanding said third window region in two dimensions within said second window region to selectively display all of said displayable information within said border of said first window region, said means for expanding said third window region being coupled to said processor.

48. The device in claim 47 wherein said computer-controlled display system further includes a signal generation means coupled to said processor, said second window region includes a first predetermined area associated with said third window region, said means for moving said third window region comprising:

means for positioning said cursor over said first predetermined area;

means for operating said signal generation means to signal the selection of said third window region for expansion while said cursor is positioned over said first predetermined area.

* * * * *